United States Patent
Sharp

(10) Patent No.: US 10,970,927 B2
(45) Date of Patent: Apr. 6, 2021

(54) POSITIONABLE EMISSIONS CONTROL WATERCRAFT

(71) Applicant: Robert John Sharp, Camarillo, CA (US)

(72) Inventor: Robert John Sharp, Camarillo, CA (US)

( * ) Notice: Subject to any disclaimer, the term of this patent is extended or adjusted under 35 U.S.C. 154(b) by 0 days.

(21) Appl. No.: 16/385,906

(22) Filed: Apr. 16, 2019

(65) Prior Publication Data

US 2019/0264596 A1 Aug. 29, 2019

Related U.S. Application Data

(60) Provisional application No. 62/635,393, filed on Feb. 26, 2018.

(51) Int. Cl.
| | |
|---|---|
| *G06T 17/20* | (2006.01) |
| *G06T 13/40* | (2011.01) |
| *G06K 9/03* | (2006.01) |
| *G06K 9/00* | (2006.01) |
| *G06T 19/20* | (2011.01) |
| *B63B 35/44* | (2006.01) |
| *B63H 21/32* | (2006.01) |
| *F01N 13/00* | (2010.01) |

(52) U.S. Cl.
CPC .............. *G06T 17/20* (2013.01); *B63B 35/44* (2013.01); *B63H 21/32* (2013.01); *F01N 13/004* (2013.01); *G06K 9/00362* (2013.01); *G06K 9/03* (2013.01); *G06T 13/40* (2013.01); *G06T 19/20* (2013.01); *F01N 2590/02* (2013.01)

(58) Field of Classification Search
CPC ......... G06T 17/20; G06T 13/40; G06T 19/20; B63B 35/44; B63B 35/00; B63B 2211/00; B63B 59/02; B63B 35/28; B63B 35/442; B63B 35/4486; B63B 35/34; B63B 27/60; B63H 21/32; B63H 19/00; B63H 21/165; B63H 21/20; B63H 23/26; B63H 21/17; F01N 13/004; F01N 2590/02; G06K 9/00362; G06K 9/03; B01D 53/00; E02B 3/26
USPC .............. 440/89 R, 6, 5, 38, 49, 66, 67, 71; 114/230.15, 219, 263, 260, 259, 211, 256, 114/258, 264, 266, 267, 230.1, 230.12, 114/230.17, 294, 295, 293; 95/291
See application file for complete search history.

(56) References Cited

U.S. PATENT DOCUMENTS

| | | | | |
|---|---|---|---|---|
| 3,749,162 | A * | 7/1973 | Anders | E21B 43/01 166/354 |
| 4,112,863 | A * | 9/1978 | Nelson | B63B 25/28 114/264 |
| 4,828,033 | A * | 5/1989 | Frison | B67D 7/002 137/615 |

(Continued)

OTHER PUBLICATIONS

California Air Resources Board, Appendix C-1, Proposed Control Measure for Ocean-Going Vessels at Berth, Standardized Regulatory Impact Assessment (SRIA), Aug. 1, 2019, Air Resources Board, Sacramento, California.

*Primary Examiner* — Justin M Jonaitis

(57) ABSTRACT

A positionable emissions control watercraft that may be placed near a serviced watercraft in a location that is away from the risk of falling cargo, while also eliminating a need for a spacer or a spacer barge, and allowing other service watercraft to access the serviced watercraft.

11 Claims, 5 Drawing Sheets

(56) References Cited

U.S. PATENT DOCUMENTS

| | | | |
|---|---|---|---|
| 7,258,710 B2* | 8/2007 | Caro | B01D 53/92 110/121 |
| 8,402,746 B2* | 3/2013 | Powell | B63H 21/32 60/281 |
| 2008/0237173 A1* | 10/2008 | Altman | B63B 27/30 212/347 |

* cited by examiner

POSITIONABLE EMISSIONS CONTROL WATERCRAFT

CROSS-REFERENCE TO RELATED APPLICATIONS

None.

This application claims the benefit of PPA Ser. No. 62/635,393, filed 2018 Feb. 26 by the present inventor, which is incorporated by reference.

FEDERALLY SPONSORED RESEARCH

None.

SEQUENCE LISTING

None.

BACKGROUND

Watercraft that provide services to other watercraft at berth comprise bunkering (fueling) tankers/barges, supply vessels/barges, and emissions control watercraft. A servicing watercraft is traditionally positioned side-by-side with a serviced watercraft and coupled together with mooring lines. Once the two watercrafts are coupled together, services or operations may begin.

In the case of emissions control watercraft, operations consist of attaching at least one hose to draw exhaust gas from a serviced watercraft through the hose to an emissions treatment system located on the emissions control watercraft to remove contaminants from the exhaust gas before releasing into the atmosphere. In the case of fueling operations or bunkering operations, operations consist of attaching at least one hose from the servicing watercraft (e.g., a bunker barge) to the serviced watercraft so that fuel and/or oil may be transferred. In the case of supply operations, operations consist of transferring materials and/or supplies between the two watercrafts.

I have encountered several significant problems with the traditional method of using an emissions control watercraft alongside (side-by-side) with a serviced watercraft and using mooring lines to secure the two watercrafts together. These problems are described below:

Problem 1: In the case where an emissions control watercraft is positioned side-by-side with a serviced watercraft that is a cargo ship in this example, there is a danger that cargo may accidentally fall off the serviced watercraft and impact the emissions control watercraft that is operating below. This is a potential danger to the emissions control watercraft and personnel. Cargo can weigh more than 65,000 pounds and can fall a distance exceeding 75 feet. Falling cargo has been known to severely damage or even sink servicing watercraft that were operating alongside.

The superstructure of serviced watercraft typically contains crew's quarters, wheelhouse/bridge, fuel connections, oil connections, and exhaust pipes. On cargo ships, the cargo sections typically occupy the space immediately before and/or aft of the superstructure. If an emissions control watercraft is secured with mooring lines alongside a serviced watercraft near the superstructure of a serviced watercraft, then any part of the emissions control watercraft that extends either before or aft of the superstructure of the serviced watercraft is in danger of being impacted by falling cargo such as shipping containers from above. Since the length of a servicing watercraft is typically in excess of 100 feet, and the superstructure of the serviced watercraft is typically only about 50 feet long, a significant fraction of the serviced watercraft is typically exposed to the danger of falling cargo.

We have tried inserting a spacer or a spacer barge between an emissions control watercraft and a serviced watercraft while using mooring lines with the intention to place the emissions control watercraft a distance away from the serviced watercraft, but this does not solve the problem. In the case where the serviced vessel is a container ship, and if a shipping container were to fall from the serviced watercraft, it would fall some distance away from the vessel, not vertically straight down. Thus, a spacer is only effective if the shipping container were to fall directly down the side of the serviced watercraft, which rarely happens. The most common cause for a shipping container falling from a serviced watercraft is when another container within the same row of containers is knocked sideways thus starting a chain reaction, knocking container to container, which eventually results in the outer container(s) being knocked overboard. The sideways force from being knocked over provides the momentum to launch the container away from the vessel. By the time the container reaches the water, its horizontal momentum has carried it several feet away from the side of the serviced watercraft. Therefore, a disadvantage of using a spacer which is typically only about 20 feet wide is that it does not appreciably reduce the danger of cargo falling onto the emissions control watercraft unless the spacer dimension is greater than about 20 feet. Even if the spacer dimension is sufficient to prevent the cargo from impacting the servicing vessel, it still impacts the spacer, which would likely still impart a significant impact to the emissions control watercraft thereby causing significant damage or injury.

Another disadvantage of using a spacer is that it requires that the spacer must be stored, moved, transported, and manipulated into position. A spacer has a disadvantage of increased cost from storage fees for the spacer when not in use. A further disadvantage is an additional cost incurred when a spacer requires more than one tugboat to position the spacer alongside an emissions control watercraft. A further disadvantage is an additional time required to move, transport, and position a spacer which increases costs and increases the amount of time it takes to connect to a serviced vessel.

Problem 2: An emissions control watercraft usually needs to be placed adjacent to the superstructure (house) of a serviced watercraft because the superstructure of the serviced watercraft is typically directly above the engine room. Thus this is where the exhaust pipes are located. On many vessels, the superstructure is near the stern (rear) of the vessel. This is true on non-containerships such as bulk carriers, tankers, Roll on/Roll off (RoRo's), and auto carriers. If a serviced watercraft is lightly loaded and therefore sits high in the water, the stern (the run) has a sharp rake (a rounded incline from perpendicular), and there is not a vertical flat area (sheer strakes) where the vessel can securely come alongside for coupling. In response to this situation, a large floating fender (a large inflated balloon-like bumper) has been used to fill the irregular gap between a servicing vessel and a non-vertical side of a serviced vessel. U.S. Pat. No. 3,063,400A by Yamaguchi Minoru and Kobayashi Takashi, dated Aug. 17 1960, and assigned to Yokohama Rubber Co Ltd, is an example of this approach. These floating fenders are typically referred to in the industry as "Yokohamas." However, a disadvantage of this common approach that it is inconvenient, complicated, time-consuming, and requires constant attention as vessel cargo is loaded and unloaded. Another disadvantage of this approach is that a serviced vessel may rise out of the water even further during the operation due to cargo unloading and reduction in ballast. The amount vertical flat area available may become critically limited, and the gap between the vessels may become excessively large, which may create an unsafe coupling situation.

Problem 3: Frequently an emissions control watercraft and another servicing watercraft need to operate on the same serviced vessel at the same time. One of many examples of this is when an emissions control barge is operating next to the superstructure of the serviced vessel, and then a bunker (fueling) barge also needs to be positioned next to the superstructure. Since both servicing vessels cannot be alongside with the serviced vessel in the same general location at the same time, the emissions control barge is forced to disconnect and be moved elsewhere, sometimes a significant distance away, until the bunkering (fueling) operations have completed. One disadvantage of this is that the emissions control watercraft cannot reduce pollution during the time that the bunker barge is in use. Another disadvantage is that the emissions control watercraft is standing-by thereby wasting energy and workforce during the time that the bunkering barge is in use, which is not cost effective.

One possible solution to this problem is to position both servicing watercraft next to each other so that both can service the serviced watercraft concurrently. However, this is not possible when both servicing watercraft use the incumbent method of using mooring lines to couple to the serviced vessel. If both servicing vessels are placed end-to-end next to the serviced vessel, then the mooring lines of one servicing vessel would cross the mooring lines of the second servicing vessel. Crossing mooring lines cannot be done safely, thereby preventing both servicing vessels from operating concurrently.

Problem 4: Servicing vessels that are used for liquid bulk carriers (e.g., tankers) that carry flammable liquids or flammable gases have special requirements. Some tanker operators prohibit mooring a barge using mooring lines next to a tanker during loading or off-loading operations for safety concerns.

SUMMARY

In accordance with one embodiment, a positionable emissions control watercraft that may be safely positioned anywhere within reach of the exhaust capture system near a serviced watercraft without the need for mooring lines or mooring devices. Said positionable emissions control watercraft comprises a plurality of spuds are dropped into the seabed below to anchor said positionable emissions control watercraft in an optimum position to make room for other servicing watercraft to operate such as bunker barges or to position said positionable emissions control watercraft away from the danger of falling containers.

DRAWINGS—FIGURES

The novel features which are characteristic of the present invention are set forth in the appended claims. However, embodiments, together with further objects and attendant advantages, will be best understood by reference to the following detailed description taken in connection with the accompanying drawings in which:

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The details of one or more embodiments of the invention are set forth in the accompanying drawings and the description below. Other features, objects, and advantages of the invention will be apparent from the description and drawings, and from the claims.

Figure 1:
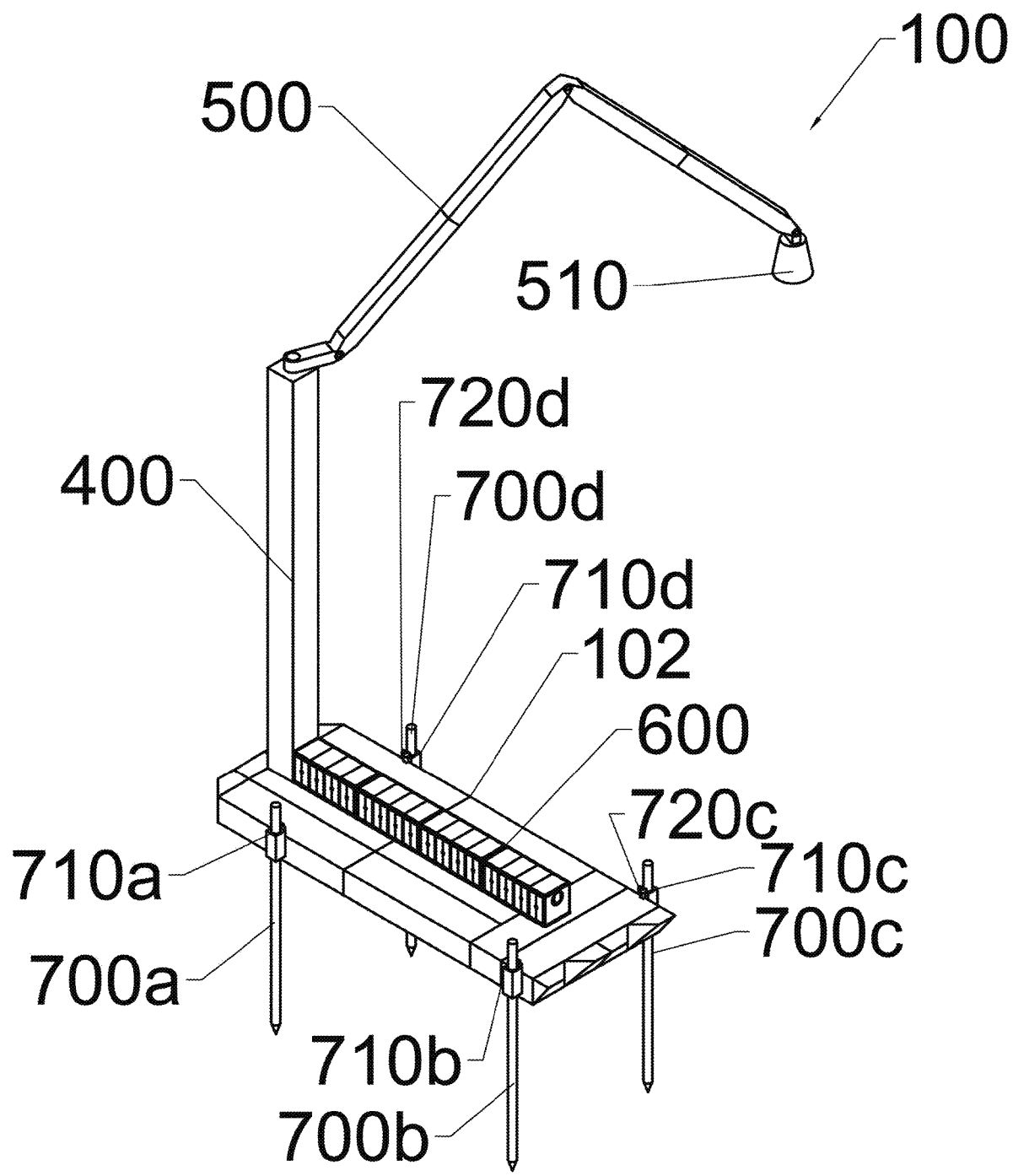
FIG. 1 shows a positionable emissions control watercraft with spuds deployed.

FIG. 1 shows one exemplary embodiment of a positionable emissions control watercraft (hereafter referred to as PECW 100) with a floating platform or barge 102. This exemplary embodiment discloses four spuds, although a lesser number of spuds may be required depending on the application, each spud comprising spud column 700, spudwell 710, and spud drive 720. Spudwell 710 functions as a vertical guide sleeve for spud column 700. Spud column 700 may be raised or lowered by spud drive 720. Spud drive 720 may be either a mechanical or hydraulic winch and line system, for example. Anyone skilled in the art can select, size, and install spuds that are appropriate for an emissions control watercraft. PECW 100 further comprises an exhaust capture system comprising of tower 400 (optional), arm 500, and exhaust pipe connector 510. In this exemplary embodiment, this exhaust capture system is hydraulically actuated, although it could be electrically actuated. PECW 100 further comprises a purification system 600. Purification system 600 is connected to receive exhaust gas from the exhaust capture system. FIG. 1 shows all four spuds deployed downward.

Figure 2:
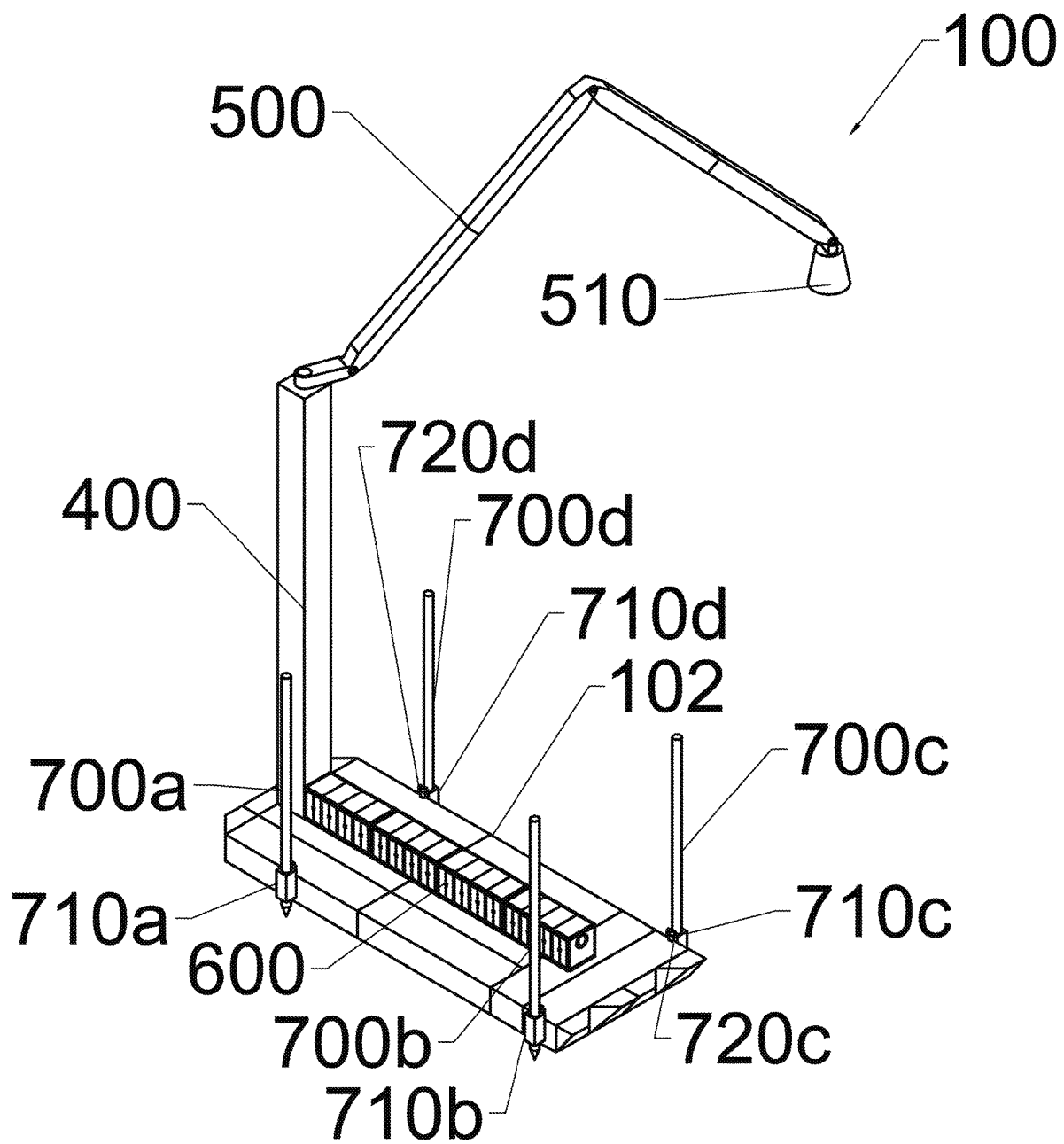
FIG. 2 shows a positionable emission control watercraft with spuds stowed for transportation or storage.

FIG. 2 shows one exemplary embodiment of a positionable emissions control watercraft (hereafter referred to as PECW 100) with a floating platform or barge main section 102. This exemplary embodiment discloses four spuds, each spud comprising spud column 700, spudwell 710, and spud drive 720. Spudwell 710 functions as a vertical guide sleeve for spud column 700. Spud column 700 may be raised or lowered by spud drive 720. Spud drive 720 may be either a mechanical or hydraulic winch and line system, for example. Anyone skilled in the art can select, size, and install a spud that is appropriate for an emissions control watercraft. PECW 100 further comprises an exhaust capture system comprising of tower 400 (optional), arm 500, and exhaust pipe connector 510. In this exemplary embodiment, this exhaust capture system is hydraulically actuated. PECW 100 further comprises a purification system 600. Purification system 600 is connected to receive exhaust gas from the exhaust capture system. FIG. 2 shows all four spuds stowed upward.

Figure 3:
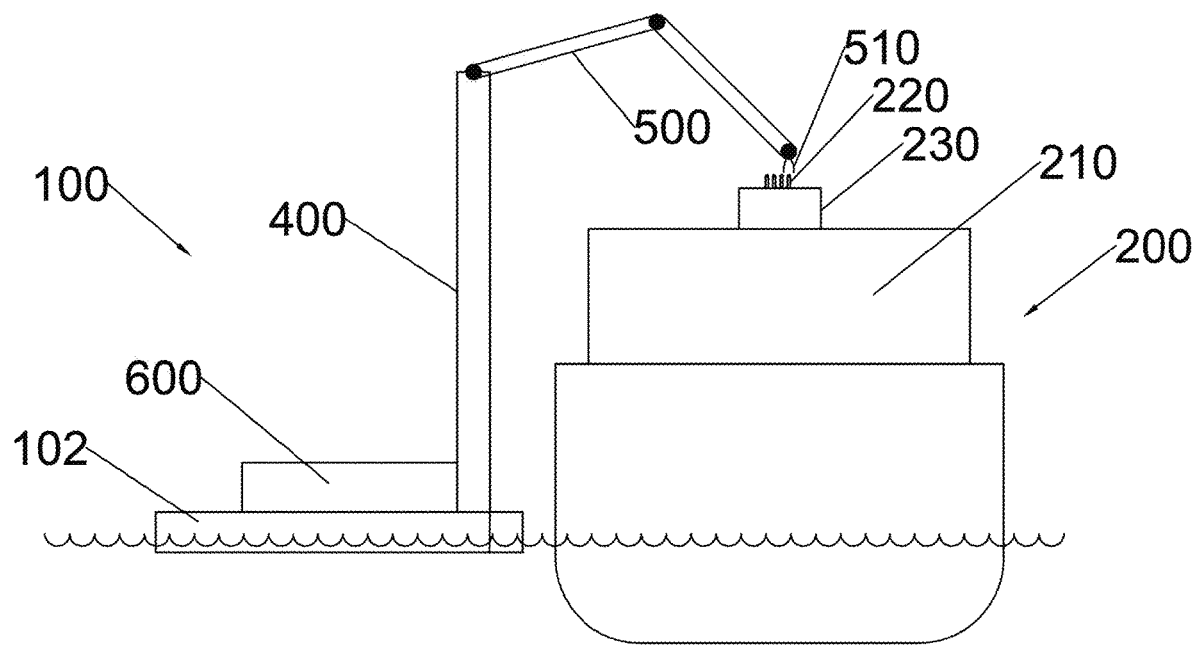
FIG. 3 shows an emissions control watercraft positioned next to a serviced watercraft.

FIG. 3 shows one exemplary embodiment of PECW 100 positioned directly adjacent to a serviced vessel 200, which is the traditional location of an emissions control watercraft. PECW 100 comprises barge 102, purification system 600, tower 400 (option), arm 500, and exhaust pipe connector 510. Serviced vessel 200 may be an oceangoing vessel (OGV) or ship, comprising superstructure 210, funnel 230, and exhaust pipes 220. In this traditional position, PECW 100 and OGV 200 are coupled with mooring lines and separated by flexible fendering or a spacer or spacer barge.

Figure 4:
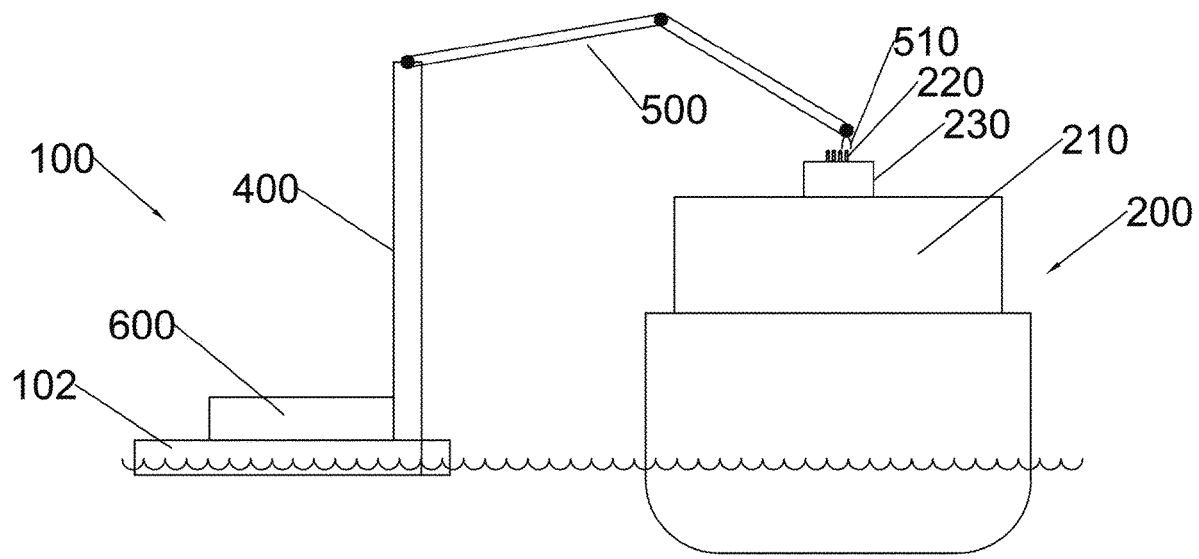
FIG. 4 shows a positionable emissions control watercraft positioned at a distance from a serviced watercraft.

FIG. 4 shows one exemplary embodiment of PECW 100 positioned an appropriate distance away from a serviced vessel 200. PECW 100 comprises a floating platform or barge 102, purification system 600, tower 400 (optional), arm 500, and exhaust pipe connector 510. Serviced vessel 200 may be an oceangoing vessel (OGV) or ship, comprising superstructure 210, funnel 230, and exhaust pipes 220. In this position, PECW 100 is placed a safe distance away from OGV 200, and PECW 100 is anchored with spuds thereby eliminating the danger of falling cargo.

Figure 5:
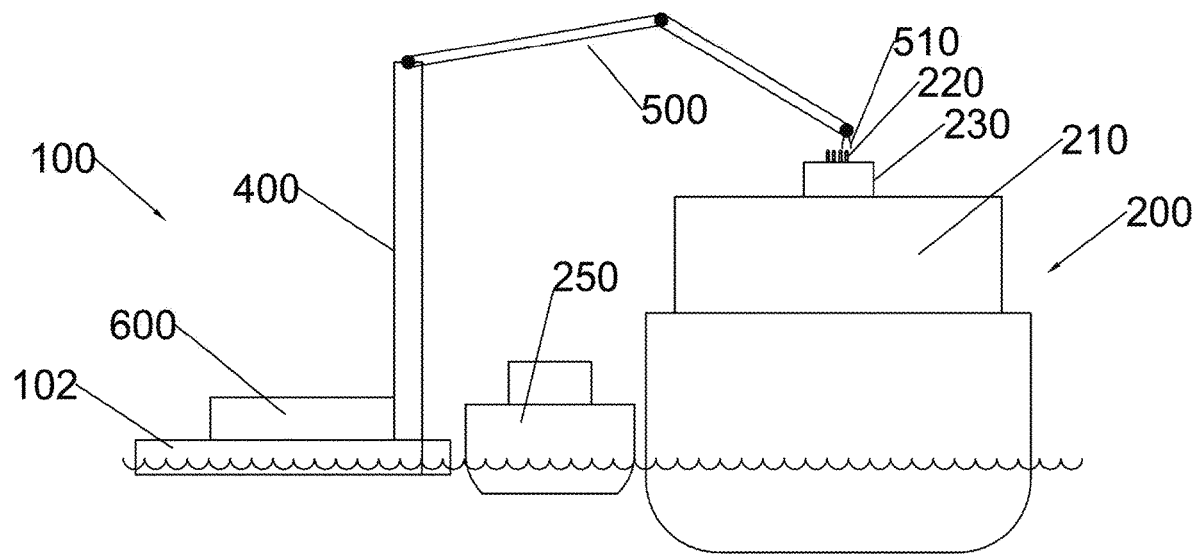
FIG. 5 shows another servicing watercraft between a positionable emissions control watercraft and a serviced watercraft.

FIG. 5 shows one exemplary embodiment of PECW 100 positioned sufficiently away from OGV 200, so that bunker barge 250 has room to fit between to PECW 100 and OGV 200. PECW 100 comprises barge 102, purification system 600, tower 400, arm 500, and exhaust pipe connector 510. Serviced vessel 200 may be an oceangoing vessel (OGV) or ship, comprising superstructure 210, funnel 230, and exhaust pipes 220. In this position, PECW 100 is placed a sufficient distance away from OGV 200 so that bunker operations may continue without moving PECW 100. Alternatively, PECW 100 positioned sufficiently fore or aft along the side of OGV 200, so that both PECW 100 and bunker barge 250 can service OGV 200 concurrently.

REFERENCE NUMERALS

100 Positionable Emissions Control Watercraft (PECW)
102 Floating Platform/Barge/Watercraft
200 Serviced Watercraft, or Vessel, or Oceangoing Vessel (OGV)
210 Superstructure
220 Exhaust Pipe
230 Funnel
250 Bunker Barge/Another servicing watercraft
400 Tower
500 Arm
510 Exhaust Pipe Connector
600 Purification System
700 Spud Column
710 Spudwell
720 Spud Drive

OPERATION

In one exemplary embodiment, as shown in FIG. 2, the spud columns 700 are raised thereby allowing transport of positionable emissions control watercraft 100 (PECW 100) across the top of the body of water. PECW 100 may be transported by one or more tugboats, or PECW 100 may be self-propelled, for example. When a serviced vessel 200, such as an oceangoing vessel (OGV) for example, comes to berth and is sufficiently moored into position, then PECW 100 is moved to any desired location within reach of the exhaust pipes of OGV 200, but with a sufficient distance between OGV 200 and PECW 100. While the spuds are still retracted upwards, PECW 100 is moved to a location where if cargo were to fall from OGV 200, the cargo would miss PECW 100 and splash into the water between PECW 100 and OGV 200. Furthermore, if bunker operations are planned during the vessel call, then PECW 100 may be placed at a sufficient distance away from OGV 200 such that a bunker barge 250 may fit between PECW 100 and OGV 200, thereby allowing both bunker operations and emissions control operations to take place at the same time. Alternatively, PECW 100 positioned sufficiently fore or aft along the side of OGV 200, so that both PECW 100 and bunker barge 250 can service OGV 200 concurrently. Cargo operations may be temporarily halted in the section above PECW 100 during the interval when PECW 100 is temporarily positioned to allow bunker barge 250 to share the same general location next to OVG 200.

This exemplary embodiment discloses four spuds, although any number of spuds could be used, although only a minimum two spuds are required, each spud comprising spud column 700, spudwell 710, and spud drive 720. Spudwell 710 functions as a vertical guide sleeve for spud column 700. Spud column 700 may be raised or lowered by spud drive 720. Spud drive 720 may be either a mechanical or hydraulic winch and line system, for example. In this exemplary embodiment, a steel cable that is attached to the foot of spud column 700 and is retracted by a hydraulic winch such that the spud column is lifted through spudwell 710 thereby allowing PECW 100 to travel along the water. The hydraulic winch could also be electrically-powered. Anyone skilled in the art can select, size, and install spud systems that are appropriate for an emissions control watercraft.

In one exemplary embodiment, as shown in FIG. 1, the spud columns 700 are lowered to the seabed thereby anchoring positionable emissions control watercraft 100 (PECW 100) and fixing the location of PECW 100 at the desired location and at a sufficient distance from OGV 200. Lowering a spud is accomplished by releasing any brakes and reversing the direction of the winch to pay out the steel cable which attached to the foot of spud column 700. Gravity pulls spud column 700 to the extent that the winch leases a length of steel cable, for example.

In another exemplary embodiment, as shown in FIG. 4, the spud columns 700 are lowered to the seabed thereby anchoring positionable emissions control watercraft 100 (PECW 100) and fixing the location of PECW 100 at the desired location and at a sufficient distance from OGV 200. Once PECW 100 is anchored in location, then arm 500 can be manipulated to bring exhaust connector 510 to an exhaust pipe 220. After connecting the exhaust capture system to an exhaust pipe 220 of OGV 200, then exhaust is drawn through the exhaust capture system and purification system 600, thereby releasing purified exhaust gas to the atmosphere.

In yet another exemplary embodiment, as shown in FIG. 5, PECW 100 is anchored in a location sufficiently distant from OGV 200 and PECW 100 is already purifying exhaust from OGV 200. In this exemplary embodiment, a bunker barge 250 has sufficient access to OGV 200 to be placed in the gap between PECW 100 and OGV 200. Thus, bunker barge 250 positions itself adjacent to OGV 200 and couples itself to OGV 200 using mooring lines or equivalent. Once bunker barge 250 is secured, then bunkering or fueling operations may begin. In the meantime, emissions continue to be treated by PECW 100 without interruption. When bunker barge 250 has completed servicing OGV 200, then bunker barge 250 is free to uncouple from OGV 200 and go to its next destination. Bunker barges typically have a beam (width) of 40' to 60', so the space formed between PECW 100 and OGV 200 needs to be sufficiently wide to allow bunker barge 250 to fit in the gap. Furthermore, arm 500 must have sufficient reach to be able to reach the furthest exhaust pipe 220 on OGV 200. Alternatively, PECW 100 positioned sufficiently fore or aft along the side of OGV 200, so that both PECW 100 and bunker barge 250 can service OGV 200 concurrently. Cargo operations may be temporarily halted in the section above PECW 100 during the interval when PECW 100 is temporarily positioned to allow bunker barge 250 to share the same general location next to OVG 200. The servicing watercraft may be positioned end-to-end next to the OGV 200 because PECW 100 does not require mooring lines, thereby eliminating the problem of crossing mooring lines so that PECW 100 and bunker barge 250 can service both service OGV 200 concurrently.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention that is seen in the above description and otherwise defined by the following claims.

CONCLUSION, RAMIFICATIONS, AND SCOPE

Accordingly, the reader will see that a positionable emissions control watercraft may be safely and effectively positioned near a serviced watercraft in an optimum orientation relative to a serviced watercraft that 1) reduces the likelihood of damage from falling cargo, 2) eliminates the need for a spacer or spacer barge, and 3) allows other service craft to access the serviced watercraft. Thus, the reader will see that at least one embodiment provides the following advantages:

A positionable emissions control watercraft that is positioned an optimum location that is sufficiently away from a serviced watercraft significantly reduces the risk of falling cargo from the serviced watercraft. Thus, if cargo were to fall from the serviced watercraft, it would fall in the space between the two watercraft, thereby splashing into the water instead of impacting the positionable emissions control watercraft.

A positionable emissions control watercraft eliminates the need for a spacer, thereby providing the following advantages:
  a) The positionable emissions control watercraft may be located away from the danger of falling cargo, thereby increasing safety, and reducing the risk damage, injury, or death from falling cargo.
  b) Eliminates the time and expense for a second watercraft or tugboat to transport a spacer to the servicing location.
  c) Eliminates the need to store said spacer in a separate location than the positionable emissions control servicing watercraft, thereby reducing slip fees.
  d) Eliminates the expense of said spacer.
  e) Eliminates the need for an additional tugboat to position and manipulate said spacer barge into position, thereby saving time and operating costs.

A positionable emissions control watercraft that may be positioned in an optimum location that so that it is not required to contact the hull of the serviced watercraft, either directly or indirectly using spacers, thus providing the following advantages:
  a) Eliminating the need to use floating fenders on the non-vertical sections of the serviced watercraft. Floating fenders are inconvenient, are complicated, take up space on the deck, and are time-consuming.
  b) Eliminating the need to constantly adjust at least one floating fender when the serviced watercraft raises or lowers in the water due to cargo loading and offloading and/or changes in ballast.
  c) Maintaining a secure relative position between the positionable emissions control watercraft and the serviced watercraft while the serviced watercraft raises or lowers in the water due to cargo loading and offloading and changes in ballast.
  d) A positionable emissions control watercraft may be positioned away from the sections of the serviced watercraft that handle cargo, thus reducing the risk of falling cargo impacting the positionable emission control watercraft. The safest location is typically adjacent to the superstructure of the serviced watercraft. However, on some vessels, the hull adjacent to the superstructure may not be vertical.
  e) The positionable emissions control watercraft may be positioned in the optimum location, even where there is limited or no vertical hull surface.

A positionable emissions control watercraft that may be placed in an optimum location that is sufficiently far from a serviced vessel such that another servicing watercraft, such as a bunker barge, can concurrently be moved between the positionable emissions control watercraft and the serviced vessel so both servicing watercraft can concurrently serve the same serviced vessel.

A positionable emissions control watercraft that may be placed in an optimum orientation that is sufficiently fore or aft along the serviced watercraft thereby allowing another servicing watercraft to operate concurrently with said positionable emissions control watercraft.

A positionable emissions control watercraft that may be placed in an optimum orientation that is nose-in to the side of the serviced watercraft and anchored with spuds, whereas the positionable emissions control watercraft is oriented perpendicular to the serviced watercraft, instead of the traditional alongside placement. Since the width of a servicing watercraft is typically roughly equivalent to the width of the superstructure on the serviced watercraft, this orientation allows the positionable emissions control watercraft to be placed directly adjacent to the servicing vessel's superstructure to avoid falling cargo.

A positionable emissions control watercraft that may be placed in an optimum location that is oriented in an explosion-safe location near a liquid-bulk carrier (e.g., tanker) which is otherwise not be possible with the traditional mooring line approach. In this case, the servicing watercraft may be positioned aft of an explosive zone while also not touching to avoid rubbing against the serviced vessel which may cause sparks due to the generation of static electricity.

I claim:
1. A positionable emissions control watercraft consisting of:
  a. a floating platform;
  b. a plurality of spuds attached to said floating platform for anchoring said floating platform at a predetermined orientation relative to a serviced watercraft at berth, each spud including a spud drive and a spud column which is configured to be raised or lowered by the spud drive, wherein the floating platform is movable along the water with the spud columns in a raised position and fixed in a desired position fixed relative to the serviced watercraft with the spud columns lowered to the seabed, wherein the floating platform is fixed in said desired position relative to the serviced watercraft without the use of floating fenders, spacers, or mooring lines and devices;

c. an exhaust capture system for receiving emissions from said serviced watercraft when the floating platform has been fixed in the desired position relative to the serviced at-berth watercraft;

d. a purification system connected to said exhaust capture system for accepting and purifying said emissions from said exhaust capture system when the floating platform has been fixed in the desired position relative to the serviced at-berth watercraft;

e. said exhaust capture system comprising an arm and an exhaust pipe connector configured to connect to an exhaust pipe of the serviced at-berth watercraft;

whereby said positionable emissions control watercraft may be placed any distance away from said serviced watercraft which allows the interconnection of said exhaust capture system to an exhaust pipe of said serviced watercraft for operation of the purification system to accept and purify said emissions.

2. The positionable emissions control watercraft of claim 1, wherein said floating platform is selected from the group consisting of a spud-barge, a self-propelled spud-barge, a vessel, a self-propelled vessel, a floating platform, a semi-submersible watercraft, a boat, or a floating dock.

3. The positionable emissions control watercraft of claim 1, wherein said floating platform may be oriented in any direction relative to said serviced watercraft and then have said spuds deployed to the seabed to maintain the orientation.

4. The positionable emissions control watercraft of claim 1, wherein said distance creates a space between said floating platform and a portion of said serviced watercraft containing a cargo with said space greater than or equal to the size of a portion of said cargo while still allowing the interconnection of said emissions control watercraft with said serviced watercraft.

5. The positionable emissions control watercraft of claim 1, wherein said distance creates a space between said floating platform and a portion of said serviced watercraft containing a flammable cargo while still allowing the interconnection of said exhaust capture system of said emissions control watercraft with the exhaust pipe of said serviced watercraft.

6. A positionable emissions control watercraft for collecting and purifying exhaust emissions from an at-berth watercraft, the positionable emissions control watercraft consisting of:

a. a floating platform;

b. a plurality of spuds attached to said floating platform for anchoring said floating platform at a predetermined orientation relative to a serviced watercraft at berth, each spud including a spud drive and a spud column which is configured to be raised or lowered by the spud drive, wherein said floating platform is movable along a surface of a body, of water with said spud columns in a raised position and fixed in a desired position relative to the serviced watercraft with said spud columns lowered to the seabed, wherein said floating platform is fixed in said desired position relative to the serviced watercraft without use of floating fenders, spacers, mooring lines and mooring devices;

c. an exhaust capture system for receiving emissions from said serviced watercraft;

d. a purification system connected to said exhaust capture system for accepting and purifying said emissions from said exhaust capture system;

e. said exhaust capture system comprising an arm and an exhaust pipe connector for connection to an exhaust pipe of the serviced watercraft;

whereby, said positionable emissions control watercraft may be placed any distance away from said serviced watercraft which allows the interconnection of said exhaust capture system of said emissions control watercraft to an exhaust pipe of the serviced watercraft that also provides a predetermined space for a third watercraft to service said serviced watercraft simultaneously with the servicing operation of the servicing watercraft.

7. A method for anchoring a positionable emissions control watercraft for purification of exhaust from an at-berth serviced watercraft, the method consisting of:

a. moving along a surface of a body of water and positioning a floating platform at a predetermined orientation near a serviced watercraft at berth, the predetermined orientation including any orientation between parallel to and perpendicular to the serviced watercraft;

b. anchoring said floating platform with a plurality of spuds extending from the floating platform to the seabed, each spud including a spud drive and a spud column which is configured to be raised or lowered by the spud drive, wherein the floating platform is movable along said surface of said body of water with said spud columns in a raised position and fixed in a desired position and orientation relative to the serviced watercraft with said spud columns lowered to the seabed, wherein said floating platform is fixed in said desired position and orientation relative to the serviced watercraft without the use of floating fenders, spacers, mooring lines and mooring devices;

c. manipulating an exhaust capture system carried by the servicing watercraft for connection to an exhaust pipe for receiving emissions from a-said at-berth serviced watercraft;

d. receiving said emissions from said exhaust capture system into a purification system; e. purifying said emissions with said purification system;

whereby said positionable emissions control watercraft may be placed any distance away from the serviced watercraft which allows the interconnection of said exhaust capture system of said emissions control watercraft to said exhaust pipe of said serviced watercraft.

8. The method of claim 7, wherein said floating platform is selected from the group consisting of a spud-barge, a self-propelled spud-barge, a vessel, a self-propelled vessel, a floating platform, a semi-submersible watercraft, a boat, or a floating dock.

9. The method of claim 7, wherein said floating platform may be oriented in any direction relative to the serviced watercraft and then said spuds deployed to maintain the orientation.

10. The method of claim 7, wherein said distance creates a space between said floating platform and a portion of said serviced watercraft containing a cargo with said space greater than the size of a portion of said cargo while still allowing the interconnection of said emissions control watercraft with said serviced watercraft.

11. The method of claim 7, wherein said distance creates a space between said floating platform and a portion of said serviced watercraft containing a flammable cargo while still allowing the interconnection of said emissions control watercraft with said serviced watercraft.

\* \* \* \* \*